United States Patent
Sato et al.

(10) Patent No.: US 7,571,711 B2
(45) Date of Patent: Aug. 11, 2009

(54) ENGINE CONTROLLER AND CONTROLLING METHOD

(75) Inventors: Shinya Sato, Hitachinaka (JP); Shinji Nakagawa, Hitachinaka (JP); Hiromu Kakuya, Hitachi (JP); Toshimichi Minowa, Mito (JP); Mamoru Nemoto, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 254 days.

(21) Appl. No.: 11/630,685

(22) PCT Filed: Aug. 13, 2004

(86) PCT No.: PCT/JP2004/011942

§ 371 (c)(1),
(2), (4) Date: Dec. 27, 2006

(87) PCT Pub. No.: WO2006/016423

PCT Pub. Date: Feb. 16, 2006

(65) Prior Publication Data

US 2008/0066718 A1    Mar. 20, 2008

(51) Int. Cl.
*F02D 41/18* (2006.01)
*G01F 1/00* (2006.01)
(52) U.S. Cl. .................. 123/350; 123/361; 701/110
(58) Field of Classification Search .......... 123/350, 123/399, 361, 198 F; 701/93, 110
See application file for complete search history.

(56) References Cited

U.S. PATENT DOCUMENTS 5,427,072 A    6/1995  Udo

| | | | |
|---|---|---|---|
| 5,625,558 A * | 4/1997 | Togai et al. | 701/93 |
| 6,959,691 B2 * | 11/2005 | Ueda et al. | 123/339.21 |

FOREIGN PATENT DOCUMENTS

| EP | 1 146 216 A2 | 10/2001 |
|---|---|---|
| JP | 2-221658 A | 9/1990 |
| JP | 08-193534 A | 7/1996 |
| JP | 2000-073831 A | 3/2000 |
| JP | 2001-047892 A | 2/2001 |

OTHER PUBLICATIONS

International Search Report dated Oct. 19, 2004 (Four (4) pages).
European Search Report dated Mar. 13, 2009 (Three (3) pages).

* cited by examiner

*Primary Examiner*—Hieu T Vo
(74) *Attorney, Agent, or Firm*—Crowell & Moring LLP

(57) ABSTRACT

When a throttle is fully open, a maximum torque set value is corrected based on the ratio between the maximum air volume set value under fully-open throttle conditions and the actual maximum air volume detected by an intake air volume meter such as an air flow sensor. Based on the corrected maximum torque set value, both the relation between the degree of accelerator opening and target torque and the relation between the target torque (target air volume) and the degree target throttle opening are corrected. Thus, even when various types of disturbances relating to torque error are generated, such as variations in air density generated in association with variations in temperature or altitude, variations over time such as contaminations of throttle chambers, or difference between machines such as engine bodies or auxiliary machines, it is possible to generate actual torque with respect to a target torque with a high degree of accuracy, while maintaining a desired relation between the degree of accelerator opening and the throttle opening.

9 Claims, 13 Drawing Sheets

ENGINE CONTROLLER AND CONTROLLING METHOD

TECHNICAL FIELD

The present invention relates to an internal combustion engine controller and a method for controlling the same. More specifically, in an automobile engine having an electronically controlled throttle, it relates to a controller for controlling a torque-based engine and a method for controlling the same.

BACKGROUND ART

As a method for controlling an automotive engine having an electronically controlled throttle, torque-based (torque demand) type engine control has been put to practical use. It involves control of a throttle, fuel, ignition, and the like, so that both a target engine torque calculated based on the degree of degree of accelerator opening and an engine speed and a separately given target air-fuel ratio are realized.

This torque-based engine control can reduce uneven torque fluctuations when switching between homogeneous combustion and stratified combustion in a stratified lean combustion system. In addition, it is advantageous in that it can smoothly process an engine torque demanded by an external device, such as a traction control, an auto cruise, or an automatic transmission by adding an interface for an externally demanded torque to a logic that calculates the target engine torque.

Engine torque, as an object to be controlled, depends on the degree of fuel injection. The degree of fuel injection is determined based on the volume of intake air measured (or estimated by an output value of an intake air pressure sensor) by an air flow sensor such that a desired air-fuel ratio is realized. Thus, the volume of intake air is closely related to engine torque.

Thus, it is possible to estimate actually generated torque based on actual air volume measured by the air flow sensor by taking information concerning the air-fuel ratio, ignition timing, or the like into consideration, without having to directly measure generated torque by a cylinder pressure sensor, a shaft torque sensor, or the like.

Particularly, in the case of a stoichiometric air-fuel ratio system in which a target air-fuel ratio A/F=14.7 is fixed, and when ignition timing is set to be near MBT, namely, Minimum spark advance for Best Torque, since engine torque is substantially proportional to the volume of intake air, mutual conversion between the actual air volume and actually generated torque can be made easier.

In torque-based engine control, operating amounts of various types of engine torque are set, so that the target engine torque and actually generated torque correspond to each other. Typical examples of such operating amounts of engine torque include degree of a target throttle opening that corresponds to the target engine torque. This can be set based on the relation between a target torque (or a target air volume) obtained through engine test data or the like and the target throttle opening.

However, when various types of disturbances concerning torque error as will be described later is generated, the relation between the target torque (target air volume) and the target throttle opening, which are set at the time of adjustment when there is no disturbance, falls apart, thereby generating deviation (mismatch) between the target air volume and the actual intake air volume. As a result, the actually generated torque deviates from the target engine torque.

Disturbances relating to such torque error include differences between machines such as engine bodies or auxiliary machines, variations in air density associated with variations in the environment such as temperature or altitude, and contaminations of an air cleaners or throttle chambers generated over time, for example.

With regard to this problem, JP Published Patent Application No. 2000-73831 A discloses a method for correcting a target throttle opening so that deviation between the target air volume and the actual intake air volume is resolved during idle operation.

However, since the process of calculating the degree of target throttle opening from the degree of accelerator opening is: degree of accelerator opening→target torque→••→target air volume→••→degree of target throttle opening, if one corrects the relation between the target torque (or target air volume) and the degree of target throttle opening alone without correcting the relation between the degree of accelerator opening and the target torque, the relation between the degree of accelerator opening and the target throttle opening falls apart as a result.

For example, there is a high possibility of a problem such that even in cases in which the throttle is set to be fully open when the accelerator is fully open at the time of data adjustment, after correcting only the relation between the target torque (target air volume) and the degree of target throttle opening, the relation between the degree of accelerator opening and the degree of target throttle opening falls apart, and thus the throttle becomes fully open before the accelerator becomes fully depressed or the throttle does not become fully open when the accelerator becomes fully depressed.

Further, as a method for solving this problem, JP Published Patent Application No. 10-141103 A (1998) or JP Published Patent Application No. 2001-47892 A proposes a method by which torque generated in a relevant environment is estimated and calculated, using a theoretical formula concerning air density and information from an intake air temperature sensor and a pressure sensor, so as to correct, based on the value, both the relation between the degree of accelerator opening and the target torque, and also the relation between the target torque (target air volume) and the degree of target throttle opening.

However, in the technologies disclosed in these gazettes, since correction concerning the target torque is performed by using an intake air temperature sensor or a pressure sensor, such a sensor is indispensable. These sensors are not necessarily included in engine-mounted vehicles, and thus the correction logic cannot be applied to vehicles that do not include such sensors.

Further, this correction logic is a method for indirectly carrying out correction of the target torque using the aforementioned theoretical formula concerning air density, but it does not use information concerning actual air volume obtained from an air flow sensor and that is strongly associated with actually generated torque, even though it is available. Thus, it is not necessarily the case that torque correction is always carried out with accuracy. Further, since it involves only a correction term concerning air density, it cannot deal with differences in engine or variations over time such as in the case of contaminations of throttle chambers.

A method for calculating a torque correction coefficient by comparing the actual air volume obtained by an air flow sensor with a target air volume is best for obtaining high torque correction accuracy. It is desirable that, when the method is implemented, an operating area in which the actual air volume and the target air volume are compared is an area in which the throttle is fully open rather than an area in which the degree of throttle opening is small, as indicated by JP Published Patent Application No. 2000-73831 A, from the viewpoint of accuracy of torque correction, to be described later.

However, in the case of a vehicle having a large exhaust capacity, for example, since sufficient acceleration force can be obtained without fully opening the throttle, the driver has less opportunity to fully open the throttle, thereby causing a problematic low frequency of executing the torque correction logic.

The present invention has been created in view of the above problems, and it is an object of the invention to provide an engine controller and controlling method capable of generating an actual torque with respect to a target torque with a high degree of accuracy while maintaining a desired relation between the degree of accelerator opening and the degree of throttle opening, even when various types of disturbances relating to torque error, such as variations in air density associated with variations in temperature or altitude, differences in engine, or variations over time, are generated.

DISCLOSURE OF THE INVENTION

When an electronically controlled throttle is fully open, the target air volume set based on engine load and the volume of air measured by an intake air volume meter are compared. The maximum air volume set value is corrected based on the comparison results, so as to correct the target air volume based on the corrected maximum air volume set value.

When the throttle is fully open, the maximum torque set value is corrected based on the ratio between the maximum air volume set value under the fully open throttle condition and the actual maximum air volume detected by an intake air volume meter such as an air flow sensor. Based on the corrected maximum torque set value, both the relation between the degree of accelerator opening and the target torque, and also the relation between the target torque (target air volume) and the degree of target throttle opening, are corrected.

Further, to increase the chance of executing this correction logic, in cases in which a fuel cut takes place during deceleration, other than in cases in which the throttle is fully opened by the driver, the electronically controlled throttle is forced to be fully open, so as to execute the correction logic for the maximum torque set value.

Thus, even when various types of disturbances relating to torque error, such as variations in air density generated in association with variations in temperature or altitude, variations over time such as contamination of a throttle chamber, or differences between machines such as engine bodies or auxiliary machines, are generated, it is possible to generate an actual torque with respect to the target torque with a high degree of accuracy while maintaining a desired relation between the degree of accelerator opening and the degree of throttle opening.

BEST MODES FOR CARRYING OUT THE INVENTION

Preferred embodiments of an engine controller of the invention will be described in detail with reference to the attached drawings.

Figure 1:
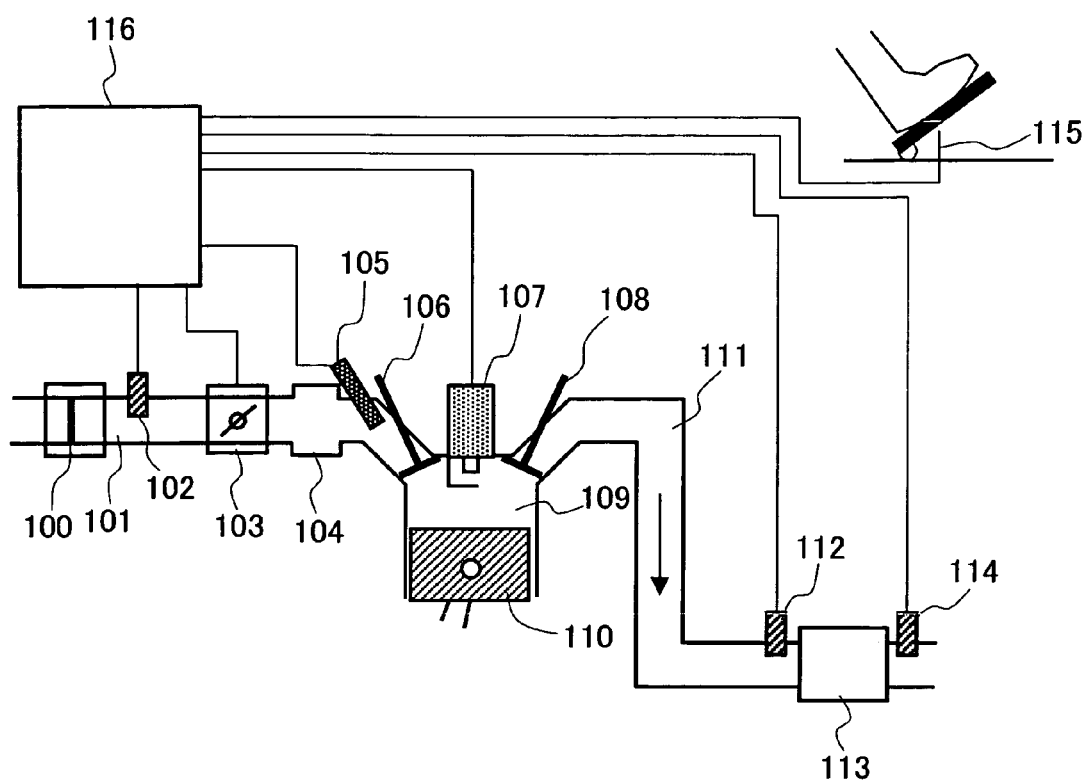
FIG. 1 shows a system configuration diagram of an embodiment of an engine system to which an engine controller according to the present invention can be applied.

Referring to FIG. 1, after intake air brought through the inlet port of an intake pipe 101 passes through an air cleaner 100 and the volume of the air is measured by an air flow sensor 102 provided in the intake pipe 101, it is introduced into the inlet port of an electronically controlled throttle valve 103 (to be hereafter referred to as "electronically controlled throttle") for adjusting the volume of intake air.

Data concerning an air volume value measured by the air flow sensor 102 is transmitted to an engine control unit 116 (referred to as the "ECU"). Based on the value, the ECU 116 calculates a fuel injection pulse width of an injector 105, so that the theoretical air-fuel ratio is achieved.

The intake air that has passed through the electronically controlled throttle 103 passes through a collector 104 and is then introduced into an intake manifold, so as to become an air-fuel mixture as the air is mixed with gasoline mist injected by the injector 105 in accordance with a fuel injection pulse width signal. It is then introduced into an engine combustion chamber 109 in synchronization with the opening/closing of an intake air valve 106.

Next, the intake air valve 106 is closed, and the air-fuel mixture compressed in the course of the rising of a piston 110 is ignited by a spark of a spark plug 107 roughly immediately before the compression top dead center, thereby depressing the piston 110 due to rapid expansion and generating engine torque.

Next, the piston 110 rises and an exhaust stroke begins from the moment an exhaust valve 108 opens. Exhaust gas is released into an exhaust manifold 111. A three-way catalyst 113 for cleaning up the exhaust gas is provided in the lower course of the exhaust manifold 111, so that HC, CO, and $NO_x$ in the exhaust gas are converted into $H_2O$, $CO_2$, and $N_2$ when the exhaust gas passes through the three-way catalyst 113.

The inlet port portion and the outlet port portion of the three-way catalyst 113 are provided with a wide-area air-fuel ratio sensor 112 and an $O_2$ sensor 114, respectively. Air-fuel ratio information separately measured by the wide-area air-fuel ratio sensor 112 and the $O_2$ sensor 114 is transmitted to the ECU 116.

An accelerator opening sensor 115 outputs a signal indicating the degree of accelerator opening to the ECU 116.

Based on these pieces of information, the ECU 116 performs feedback control of the air-fuel ratio by adjusting the amount of fuel injection, so that the air-fuel ratio approaches the desired theoretical value.

An embodiment of a controller that performs torque-based engine control in the above-described engine system will be hereafter described with reference to the block diagram of FIG. 2.

Basically, when a throttle is fully open, this engine controller compares the target air volume that is set based on engine load with the volume of air actually measured by the intake air volume meter, and it corrects the target air volume based on the comparison results.

Namely, when the throttle is fully open, the maximum air volume set value is corrected based on the results of a comparison between the target air volume set based on engine load and the volume of air actually measured by the intake air volume meter, and the target air volume is corrected based on the corrected maximum air volume set value.

The engine controller refers to the ECU 116, and a maximum torque set value calculating means 200, an idle demand torque calculating means 201, a driver demand torque calculating means 202, a target torque calculating means 203, an air-based torque control path 220, and an ignition/fuel-based torque control path 230 are embodied through software processing.

By using engine speed (measured value) and the volume of actual intake air actually measured by the air flow sensor 102, the maximum torque set value calculating means 200 calculates a maximum torque set value at any given engine speed.

The idle demand torque calculating means 201 calculates the torque necessary for maintaining a target idle speed based on engine speed.

The driver demand torque calculating means 202 calculates the most fundamental demand torque in torque-based engine control. It calculates the engine torque demanded by a driver based on the degree of accelerator opening, the maximum torque set value calculated by the maximum torque set value calculating means 200, and the idle demand torque calculated by the idle demand torque calculating means 201.

The target torque calculating means 203 calculates the final target engine torque, and it receives the driver demand torque calculated by the driver demand torque calculating means 202, and external demand torques, such as transmission demand torque, VDC ("Vehicle Dynamics Control") demand torque, cruise control demand torque, and the like, so as to calculate the final target engine torque in view of the priority of each.

The target engine torque calculated by the target torque calculating means 203 is separately transmitted to the air-based torque control path 220 that performs torque control by changing the volume of intake air with the use of the electronically controlled throttle 103 and to the ignition/fuel-based torque control path 230 that assists torque control by changing fuel/ignition, such that engine is outputted as air-based (throttle-operation-based) target torque and as fuel/ignition-operation-based target torque, respectively.

The air-based torque control path 220 includes a maximum air volume converting means 204, a target air volume calculating means 205 in air-based torque control, a normalized target air volume calculating means 206, and a target throttle opening calculating means 207.

The target air volume calculating means 205 calculates the target air volume necessary for realizing an air-based (throttle-operation-based) target torque.

The maximum air volume converting means 204 calculates the maximum air volume (maximum air volume set value) that corresponds to the maximum torque set value calculated by the maximum torque set value calculating means 200.

The target air volume calculated by the target air volume operating means 205 and the maximum air volume set value obtained from the maximum air volume converting means 204 are inputted to the normalized target air volume calculating means 206. The normalized target air volume calculating means 206 calculates the volume of normalized target air by calculating the ratio between the two.

The target throttle opening calculating means 207 calculates the degree of target throttle opening necessary for realizing the normalized target air volume calculated by the normalized target air volume calculating means 206 and outputs the results of the calculation (control command value) to the electronically controlled throttle 103.

The ignition/fuel-based torque control path 230 is used for carrying out a desired torque-down by ignition retard or a fuel cut, in the case of a fuel cut performed during deceleration or during a high-speed rotation of the engine, or when a high-speed torque-down is demanded from the outside.

This ignition/fuel-based torque control path 230 includes an air-component estimation torque calculating means 208, a means 209 for calculating the amount of torque correction for ignition/fuel control, a torque control method selecting means 210, a torque control amount distributing means 211, a means 212 of controlling the correction amount of ignition timing, and a means 213 of calculating the number of fuel cut cylinders.

The estimated air-component torque calculating means 208 calculates the torque that is necessary when torque control using ignition/fuel is performed. Specific contents of the operation for calculating the torque is that an estimated air-component torque is calculated by executing a process in view of an intake air delay component based on the air-based target torque inputted by the target torque calculating means 203, in order to estimate torque generated when it is assumed that torque control is carried out by a throttle alone without performing torque control through ignition/fuel.

In order to calculate a torque correction factor for ignition/fuel control that can be an indication when performing torque control through ignition/fuel, the means 209 for calculating the amount of torque correction for ignition/fuel control calculates the ratio of the estimated air-component torque operated by the estimated air-component torque calculating means 208 to the target torque for ignition/fuel control inputted by the target torque calculating means 203.

The torque control method selecting means 210 selects an appropriate torque control method based on the torque correction factor for ignition/fuel control calculated by the means 209 for calculating the amount of torque correction for ignition/fuel control, operational status, and the like. Ignition timing correction, fuel cut, or a combination thereof may be selected as the torque control method.

The torque controlling amount distributing means 211 distributes the torque controlling amount to the means 212 of calculating the correction amount of ignition timing and the means 213 of calculating the number of fuel cut cylinders, based on the torque correction factor for ignition/fuel control operated by the means 209 for calculating the amount of torque correction for ignition/fuel control and based on the torque control method selected by the torque control method selecting means 210.

Based on the torque correction factor individually distributed by the torque controlling amount distributing means 211, the means 212 of calculating the correction amount of ignition timing and the means 213 of calculating the number of fuel cut cylinders calculates the correction amount of ignition timing and the number of fuel cut cylinders. By reflecting the operation results in the ignition control system and the fuel control system, the desired engine torque can be realized even during a transitional period.

Figure 3:
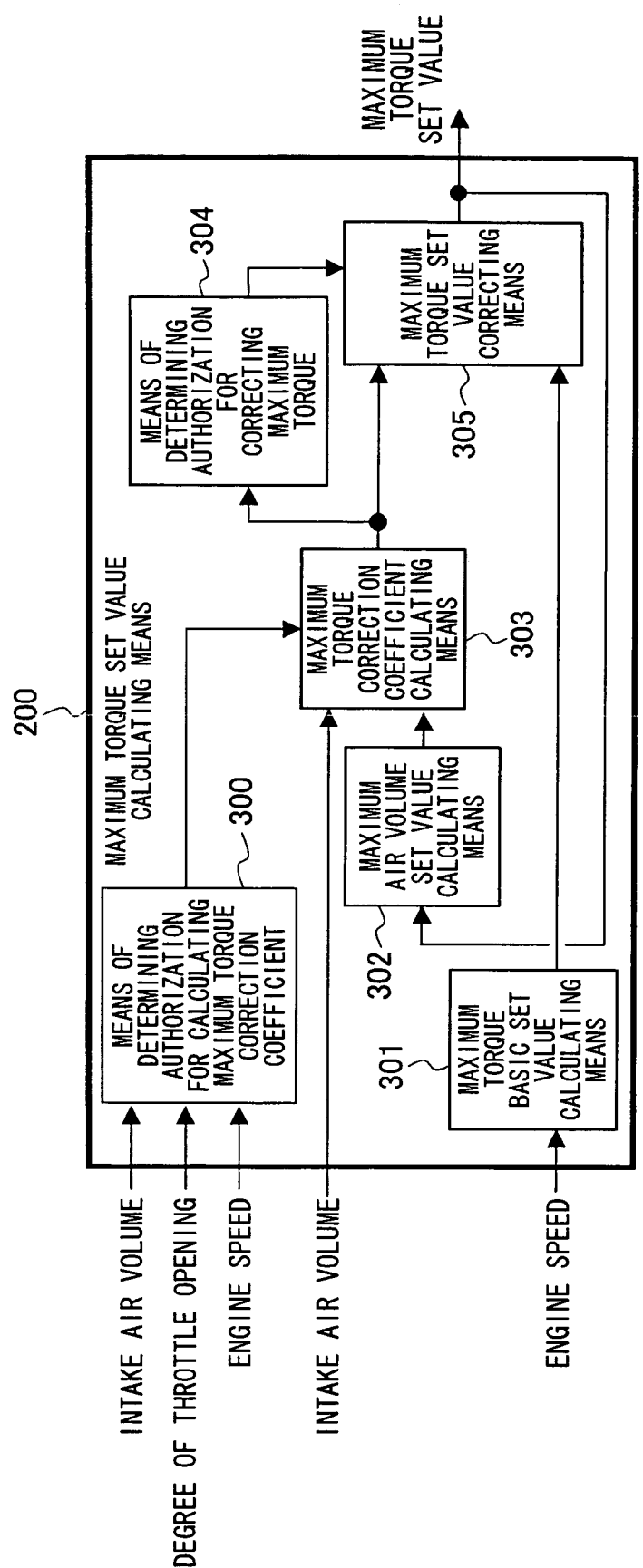
FIG. 3 shows a block diagram of the details of a maximum torque set value calculating means of the engine controller according to the embodiment.

Next, the details of the maximum torque set value calculating means 200 will be described with reference to FIG. 3.

The maximum torque set value calculating means 200 includes a means 300 of determining authorization for calculating a maximum torque correction coefficient, a maximum torque basic set value calculating means 301, a maximum air volume set value calculating means 302, a maximum torque correction coefficient calculating means 303, a means 304 of determining authorization for correcting a maximum torque, and a maximum torque set value correcting means 305.

The means 300 of determining authorization for calculating a maximum torque correction coefficient determines authorization for calculating a maximum torque correction coefficient, based on information such as the volume of intake air, the degree of throttle opening, and engine speed.

Specifically,
(a) The degree of throttle opening is equal to or greater than a certain threshold value, in which the throttle is nearly fully open, and the variation width of the degree of throttle opening is within a range defined by certain threshold values.
(b) The variation width of the engine speed is within a range defined by certain threshold values.
(c) The variation width of the volume of intake air is within a range defined by certain threshold values.

When all the above conditions (a) to (c) are satisfied, determination of authorization for calculating a maximum torque correction coefficient is performed.

The maximum torque basic set value calculating means 301 is fed an engine speed, so as to calculate a maximum torque basic value at such engine speed. In the present embodiment, data at the time of adjustment is stored on a map, and the maximum torque basic set value is calculated by map search.

The maximum air volume set value calculating means 302 calculates a maximum air volume set value based on a maximum torque set value, which is the final output value in the present control block.

When operation is authorized by the means 300 of determining authorization for calculating a maximum torque correction coefficient, the maximum torque correction coefficient calculating means 303 calculates a maximum torque correction coefficient=(when a throttle is fully open) actual intake air volume/maximum air volume set value on the premise of the relation: engine torque ∝ intake air volume.

The actual intake air volume is the volume of intake air measured (actual measurement) by the air flow sensor 102. The maximum air volume set value is the volume of maximum air calculated by the maximum air volume converting means 204 in response to the maximum torque set value.

The means 304 of determining authorization for correcting a maximum torque evaluates validity of the maximum torque correction coefficient from the maximum torque correction coefficient calculating means 303 to prevent error learning. When sufficient validity is determined, authorization for correcting the maximum torque set value is determined.

In the embodiment, validity is determined in accord with the following:
(d) The maximum torque correction coefficient is within a range defined by assumed upper and lower limits.
(e) The maximum torque correction coefficient has approximately the same value as that of the last time and that of the time before the last time (when approximately the same maximum torque correction coefficient was calculated three times in a row).

When the above conditions (d) and (e) are satisfied, authorization for correcting the maximum torque set value is determined.

When an authorization for correcting the maximum torque set value is determined by the means 304 of determining authorization for correcting a maximum torque, the maximum torque set value correcting means 305 performs the following operation so as to correct the maximum torque set value:

maximum torque set value=maximum torque basic set value×maximum torque correction coefficient (initial setting=1).

Since correction is carried out based on an actual maximum air volume obtained as a result without identifying the variation factors of the maximum air volume in advance, this maximum torque setting logic can manage various air volume variation factors.

Namely, it is possible to manage not only correction relating to air density such as atmospheric pressure or intake-air temperature as in conventional technologies, but also difference in engine and variation over time, such as contamination of a throttle chamber.

Figure 4:
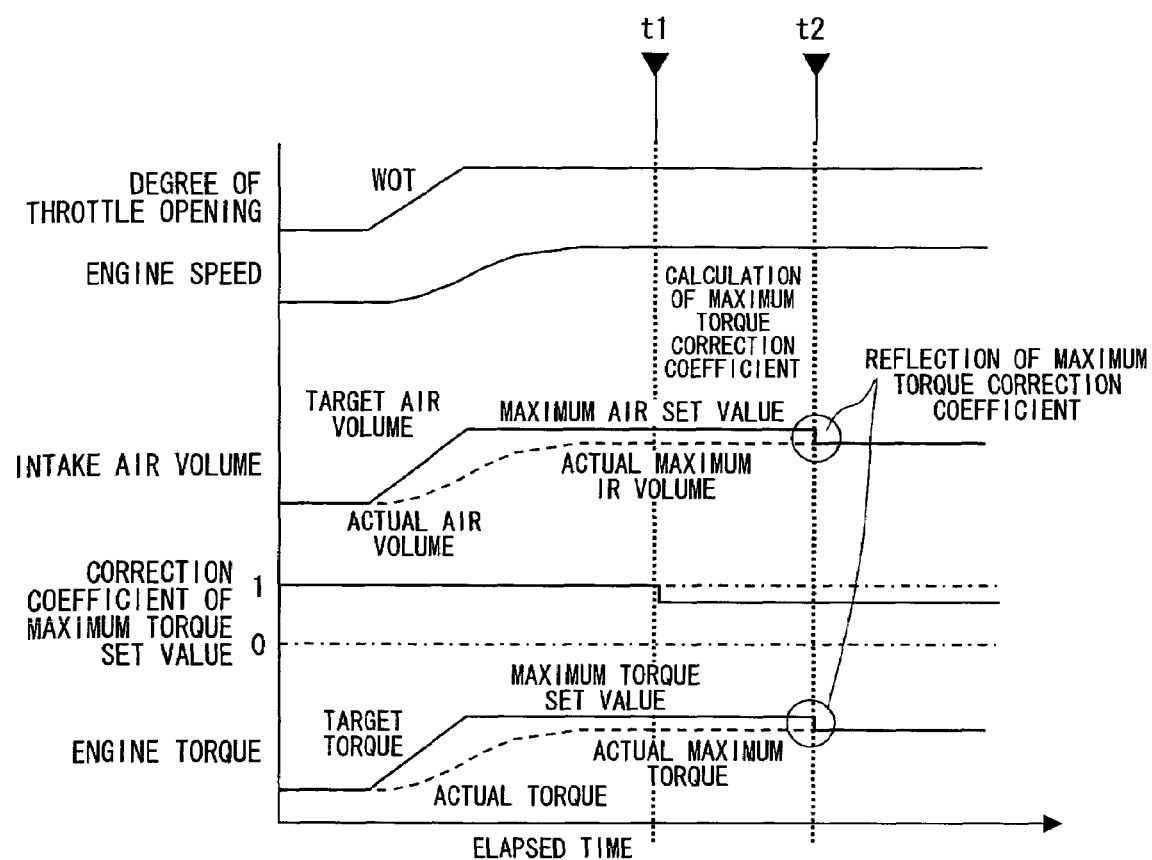
FIG. 4 shows a time chart of the maximum torque set value calculation according to the embodiment.

Next, the flow of logic operation for correcting the maximum torque set value will be described with reference to FIG. 4.

When the throttle becomes fully open, such state is maintained for a while, and the variation amount of engine speed and intake air volume becomes small (almost steady state can be recognized), the means 300 of determining authorization for operating a maximum torque correction coefficient performs authorization determination at time t1, and a maximum torque correction coefficient is calculated in accordance with the foregoing maximum torque setting logic.

When the means 304 of determining authorization for correcting maximum torque determines that the calculated maximum torque correction coefficient is valid, the maximum torque basic value is multiplied by the correction coefficient by the maximum torque set value correcting means 305 at time t2. Namely, the latest maximum torque correction coefficient is reflected and a maximum torque set value that approximately corresponds to actual maximum torque is calculated.

Next, functions of the driver demand torque calculating means 202 and the nature of the operation will be described with reference to FIGS. 5(*a*) to (*d*).

Figure 5:
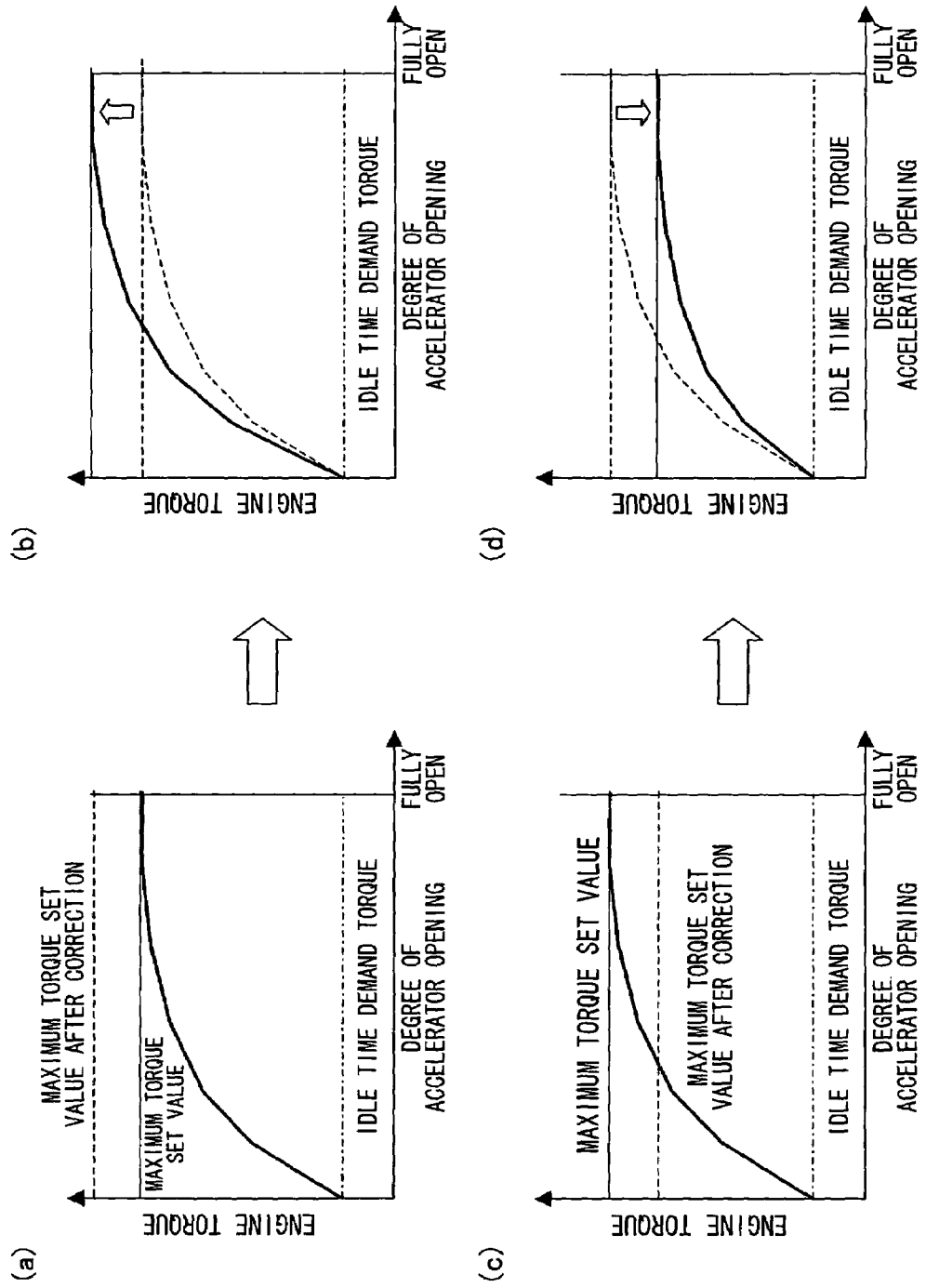
FIGS. 5(a) to (d) each show a graph of the relation between the degree of accelerator opening and engine torque according to the embodiment.

As shown in FIGS. 5(*a*) and (*c*), the driver demand torque calculating means 202 sets the relation between the degree of accelerator opening and the target torque, so that it calculates idle demand torque when the degree of accelerator opening is fully closed, and it calculates a maximum torque set value when the degree of accelerator opening is fully open.

In cases in which the maximum torque set value has been corrected with respect to the initial maximum torque set value by the maximum torque set value calculating means 200, the relation between the degree of accelerator opening and the target torque is corrected, so that, when the accelerator is fully open, the corrected maximum torque set value is calculated, as shown in FIG. 5(*b*) or (*d*).

Such correcting means includes various methods. For example, the following calculation may be carried out:

driver demand torque=idle demand torque+α×initial setting accelerator component demand torque α=(after-correction maximum torque set value−idle demand torque)/(initial maximum torque set value−idle demand torque at the time of initial setting).

Figure 6:
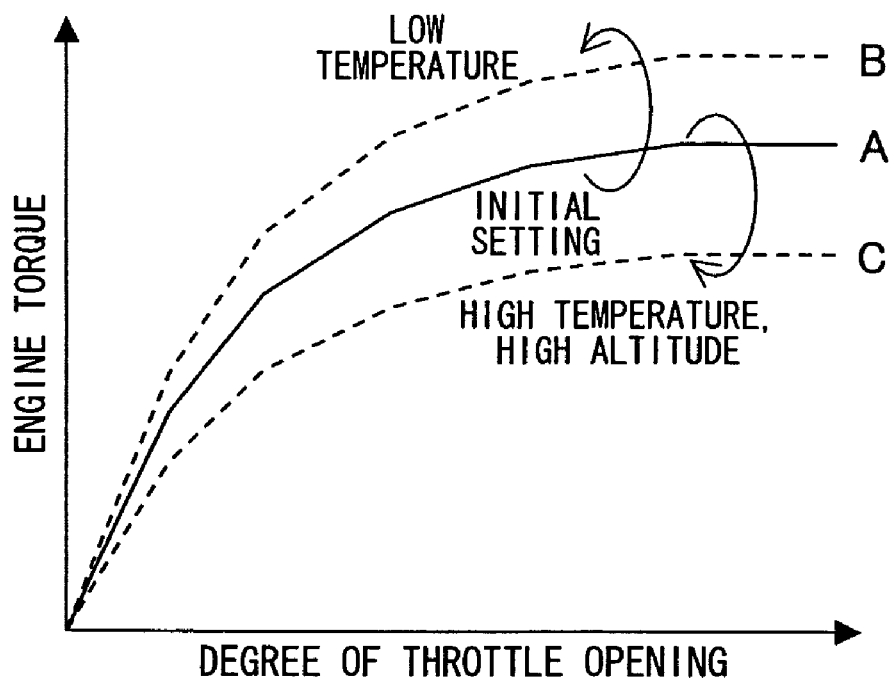
FIG. 6 is a graph showing variation of the degree of throttle opening/engine torque characteristics relation due to variation in temperature and altitude.

Next, functions and effects of the air-based torque control path 220 will be described with reference to FIGS. 6 to 8.

The relation of the degree of throttle opening to the volume of intake air changes depending on the environment, differences between engines, time degradation, and the like. FIG. 6 shows, as an example, the relation between the degree of throttle opening and the volume of intake air when air density is changed due to variation in the environment, such as in temperature or altitude.

When air density is increased due to a low temperature (driving in a cold region) or the like, the volume of intake air is increased as property B shows, compared with an initial set value (property A) having the same degree of throttle opening.

In contrast to this, when air density is decreased due to variation in the environment such as in high-temperature (driving in a high-temperature region) or high-altitude driving, the volume of intake air is decreased as property C shows, compared with the initial set value (property A) having the same degree of throttle opening.

Figure 7:
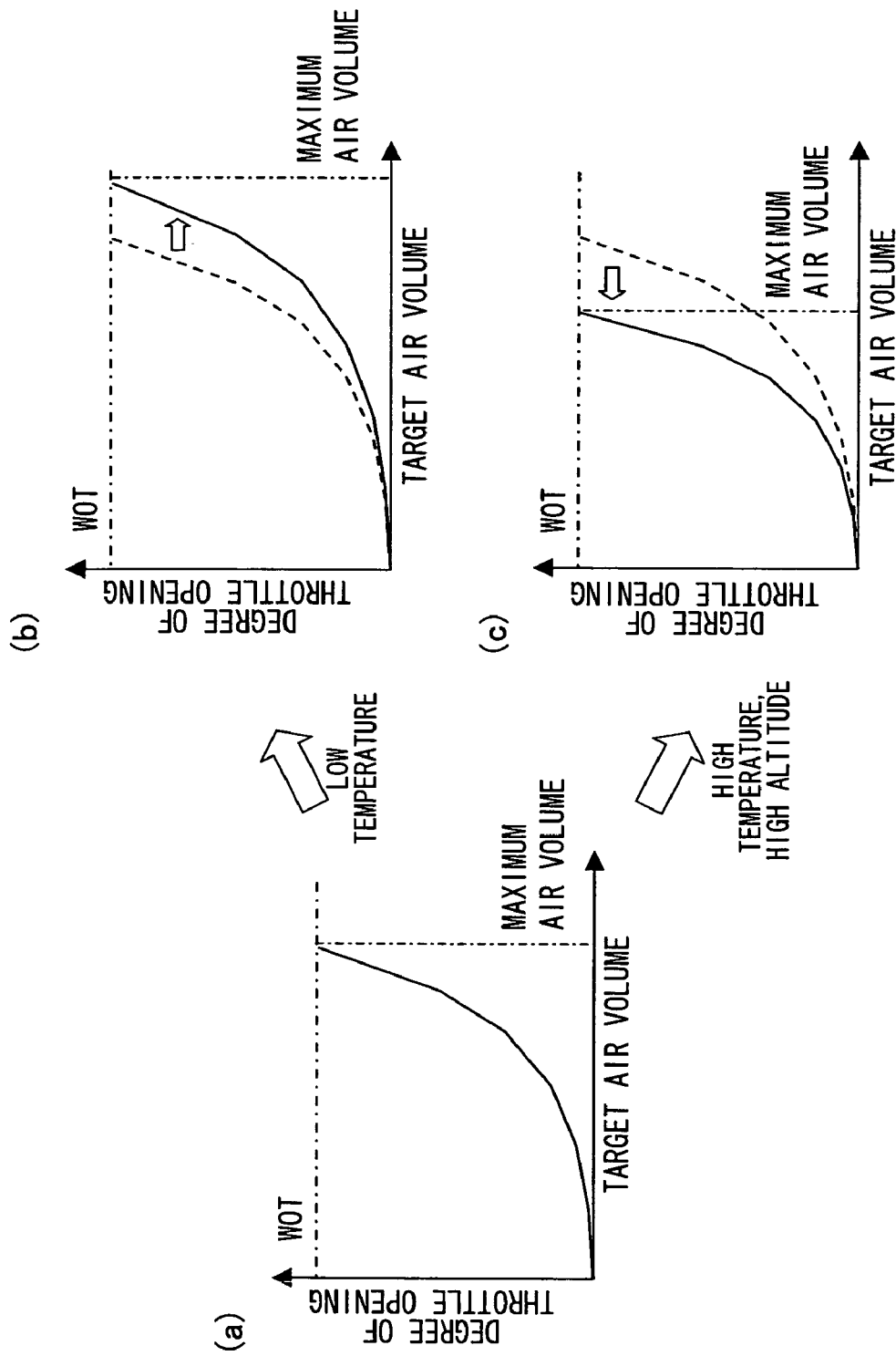
FIGS. 7(a) to (c) are graphs showing the relation between the volume of target air and the degree of throttle opening at an initial setting, low temperature, and high temperature/high altitude, respectively.
Figure 8:
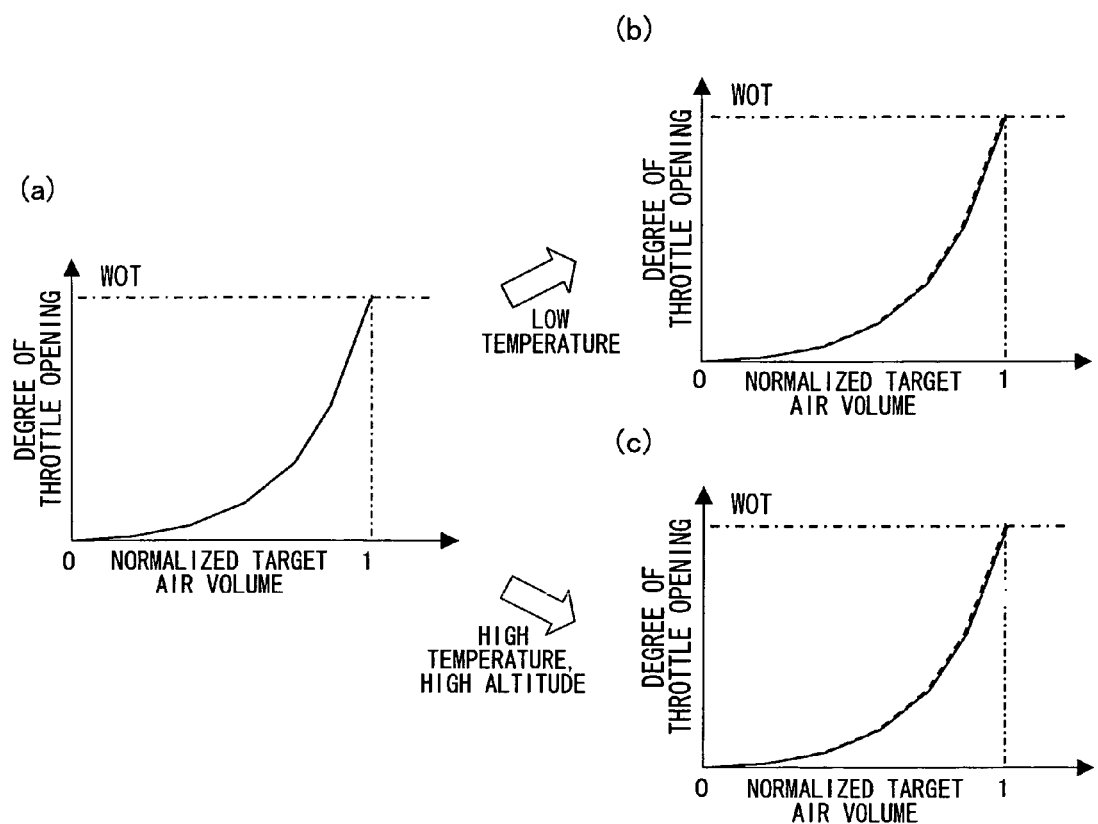
FIGS. 8(a) to (c) are graphs of the relation between the volume of normalized target air and the degree of throttle opening according to the embodiment.

When the target throttle is operated based on the target air volume by mapping this relation and using an operation map of the target air volume and the throttle opening, it is necessary to change the operation map depending on the environment, as shown in FIGS. 7(*a*) to (*c*). Thus, there has been a problem in that man-hours for adjustment or the capacity of a ROM that stores operation maps would be increased due to an increase in the number of necessary operation maps. Note that FIG. 7(*a*) is for standard conditions (for initial setting), FIG. 7(*b*) is for low temperature, and FIG. 7(*c*) is for high temperature/high altitude.

In order to cope with this, in the present embodiment, instead of the target air volume, a normalized target air volume is used as an argument of the target throttle opening operation map.

The normalized target air volume refers to a quotient obtained by dividing the target air volume by the maximum air volume that is corrected in conjunction with the maximum torque set value, and its dynamic range is 0 to 1. FIGS. 8(*a*) to (*c*) show the relation between the normalized target air volume and the degree of throttle opening. Because of such normalization, the dynamic range of the map grid axis is 0 to 1, irrespective of the environment. Thus, since the grid axis remains unchanged and the characteristic curve also can be considered unchanged, a single map created during adjustment can manage the initial setting, low temperatures, and high temperatures/high altitudes, as shown in FIGS. 8(*a*) to (*c*).

By means of the above-described maximum torque set value calculating means 200, driver demand torque calculating means 202 in which the calculation result of the maximum torque set value calculating means 200 is reflected, and the target throttle opening calculating means 207, even if various types of disturbances relating to torque error (variations in air density, variations with time, differences in engine, or the like) occur, both the relation between the degree of accelerator opening and the target torque, and the relation between the target torque (target air volume) and the degree of target throttle opening can be corrected with a high degree of accuracy.

Consequently, it is possible to generate the actual torque with respect to the target torque with a high degree of accuracy while maintaining a desired relation between the degree of accelerator opening and the throttle opening.

Figure 9:
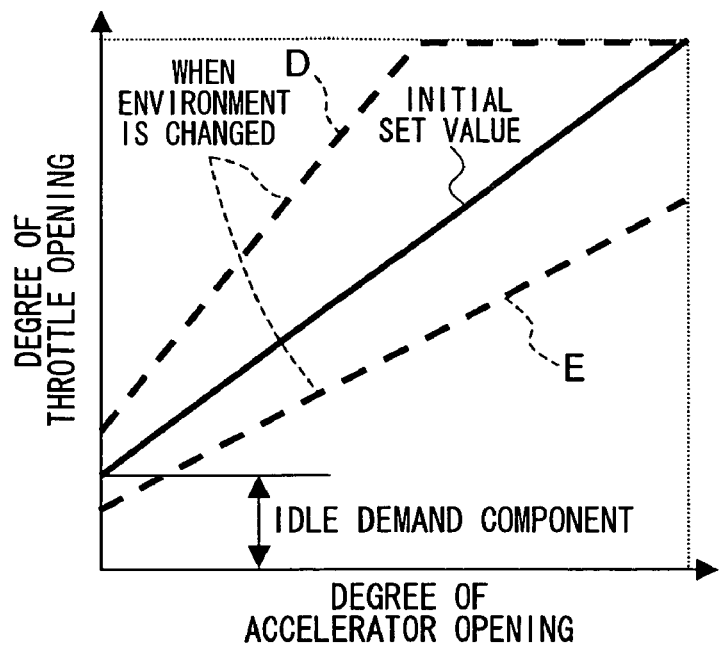
FIG. 9 shows a graph of the relation between the degree of accelerator opening and the degree of throttle opening when conventional technology is applied.

Specifically, focusing on the relation between the degree of accelerator opening and the degree of throttle opening, when the target torque (target air volume) and the degree of target throttle opening alone were corrected upon an environmental change, problems were caused such that the throttle became fully open before the accelerator became fully depressed (property D), or the throttle did not become fully open even when the accelerator became fully depressed (property E), as shown in FIG. 9.

Figure 10:
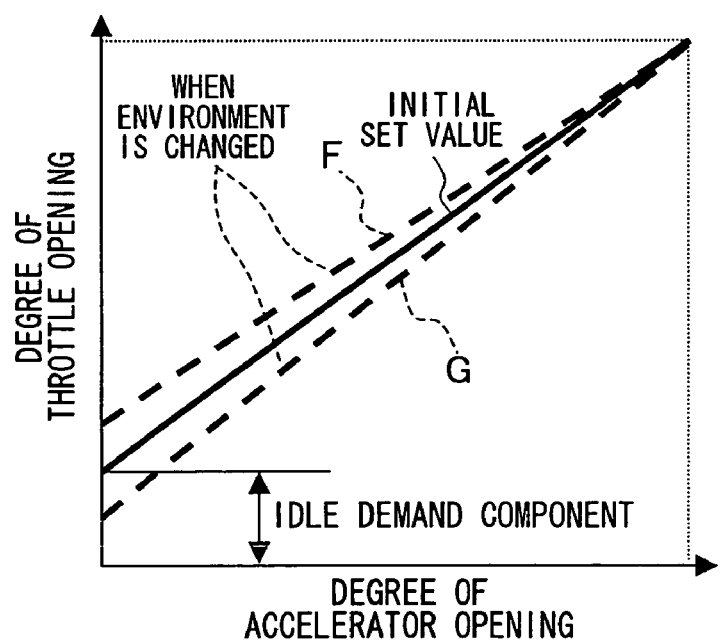
FIG. 10 shows a graph of the relation between the degree of accelerator opening and the degree of throttle opening according to the embodiment.

In contrast to this, as shown in FIGS. 5(*a*) to (*d*), in the present logic, the maximum torque is always calculated when the accelerator is fully depressed, and yet at the same time, when the maximum torque has been calculated, since the degree of throttle opening is selected to be fully open after the maximum torque→maximum air volume→normalized target air volume=1 calculation, as shown in FIG. 10, it is possible to maintain property F or G. whereby the throttle becomes fully open when the accelerator is fully open under all circumstances.

Note that the degree of target throttle opening can be calculated based on the following operational expression as described above:

normalized target air volume=target air volume/maximum air volume=target torque/maximum torque Thus, by correcting the maximum torque in the present logic when an environment such as temperature or altitude is changed while the target torque is at a constant state, as clear from the above operational expression, the normalized target air volume is automatically corrected in accordance with the correction of the maximum torque, so as to realize the target torque.

Figure 11:
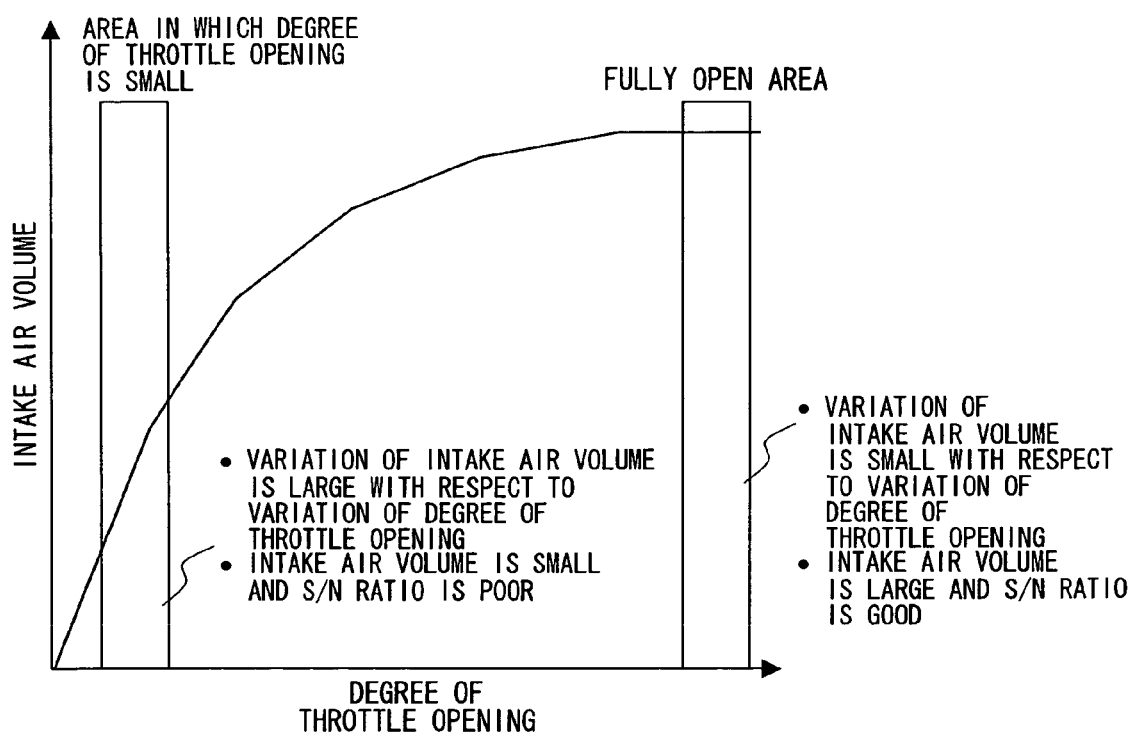
FIG. 11 shows a graph of the relation between the volume of intake air and the degree of throttle opening, used to show an operating area suitable for maximum torque set value correction.

It is desirable that the calculation of the maximum torque correction coefficient is carried out when the throttle is nearly open, and not in an area in which the throttle opening is small. As shown in FIG. 11, the reason is that it is possible to accurately compare the target air volume with the actual air volume since, in an area in which the throttle is fully open, the intake air volume is in a state of saturation with respect to variation of the degree of throttle opening, and thus the intake air volume is stable even when the degree of throttle opening somewhat changes. Further, in this area, an output signal from the air flow sensor is large, and thus, it is advantageous from the viewpoint of the S/N ratio in view of measurement errors of the air flow sensor.

However, in the case of a vehicle having a large exhaust capacity or the like, since a sufficient acceleration force can be obtained without fully opening the throttle, the driver has less opportunity to fully open the throttle, thereby causing the problem that the frequency of performing the above calculation of the maximum torque correction coefficient is significantly decreased.

Figure 12:
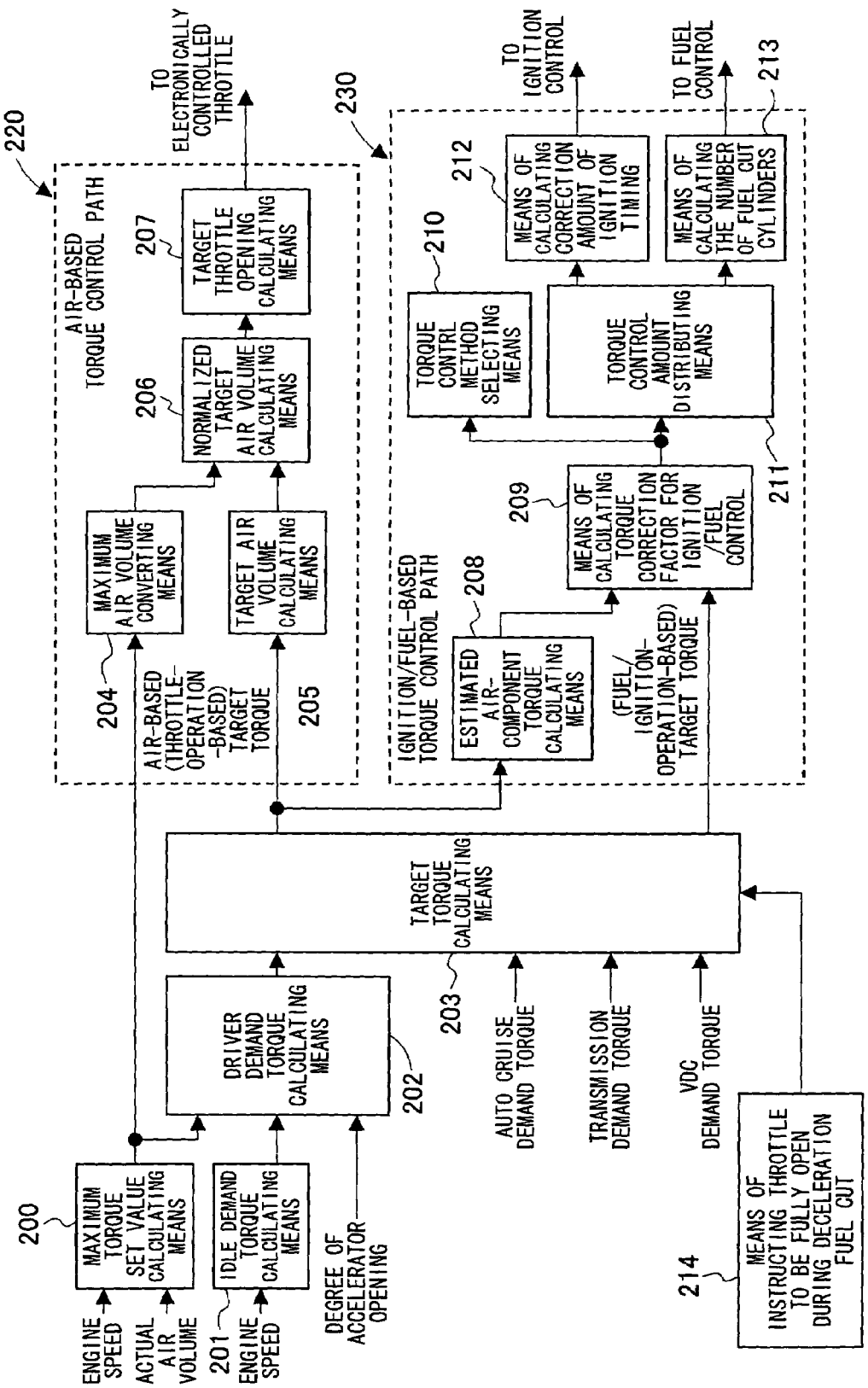
FIG. 12 shows a block diagram of another embodiment of the engine controller according to the invention.

In view of this, an embodiment of a controller for performing torque-based engine control will be described with reference to the block diagram of FIG. 12. Note that portions in FIG. 12 corresponding to portions in FIG. 2 are denoted by the same reference numerals as those in FIG. 2 and the descriptions thereof are omitted.

In this embodiment, a function has been added that forces the throttle to be fully open during a deceleration fuel cut and performs the calculation of the maximum torque correction coefficient, so as to increase the frequency of performing the calculation of the maximum torque correction coefficient.

Figure 2:
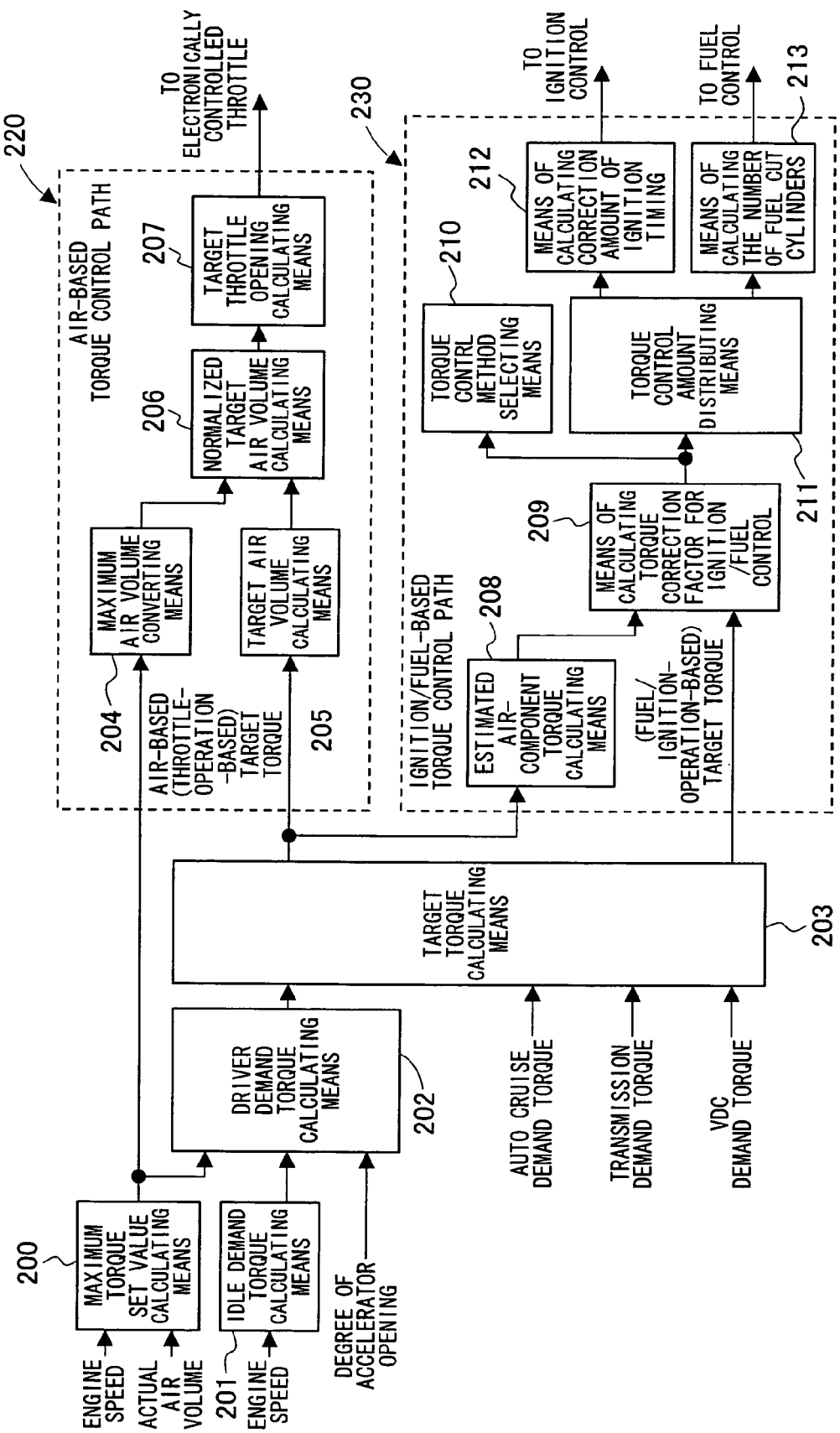
FIG. 2 shows a block diagram of an embodiment of the engine controller according to the invention.

For this reason, in this embodiment, a means 214 of instructing a throttle to be fully open during a deceleration fuel cut is added to the engine controller shown in FIG. 2.

The means 214 of instructing a throttle to be fully open during a deceleration fuel cut has a function that forcibly replaces the air-based (throttle-operation-based) target torque by the maximum torque set value only for a certain period when the following conditions are satisfied; a flag for executing a deceleration fuel cut is ON and a fuel cut is being carried out with respect to all cylinders.

Figure 13:
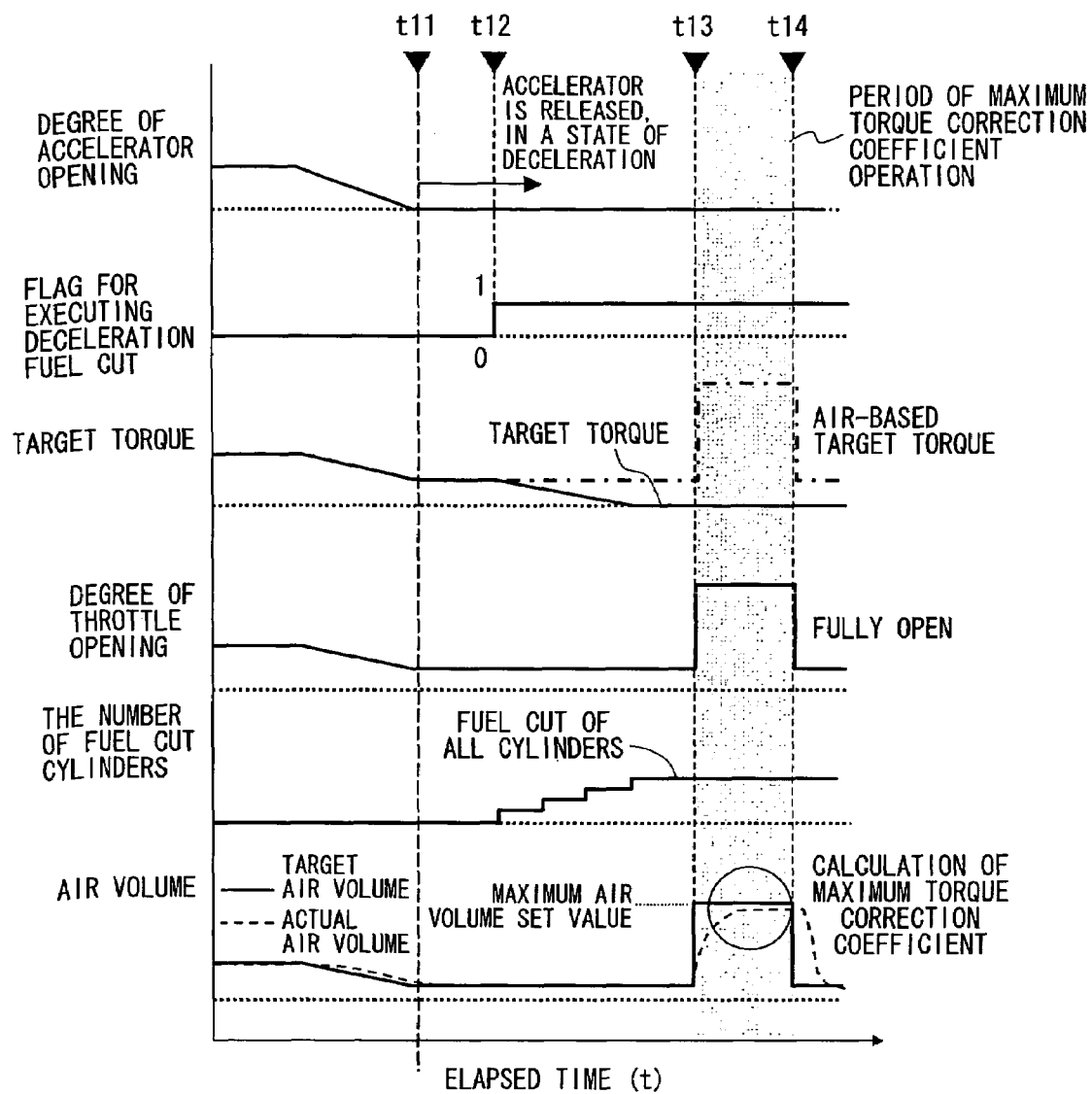
FIG. 13 shows a time chart of the maximum torque set value calculation according to another embodiment.

FIG. 13 shows a timing chart of the logic operation for forcing a throttle to be fully open during a deceleration fuel cut and carrying out the calculation of the maximum torque correction coefficient.

When the driver releases the accelerator at time t11 and the degree of accelerator opening becomes nearly fully closed, if the engine speed is greater than a certain threshold value, the flag for executing a deceleration fuel cut becomes ON (0→1) (time t12).

Subsequently, the deceleration fuel cut begins, and when finally the fuel cut has been carried out with respect to all the cylinders, the air-based (throttle-operation-based) target torque is forcibly replaced by the maximum torque set value at time 13 by the means 214 of instructing a throttle to be fully open during a deceleration fuel cut. This state continues for a predetermined period of time until time t14.

As a result, the throttle becomes fully open during this period (t13 to t14), and the logic for calculating the maximum torque correction coefficient (calculation of the ratio of the maximum air volume set value to the actual maximum air volume) is carried out in conjunction therewith.

Since combustion torque is not generated during the deceleration fuel cut, drivability is influenced very little, even when the throttle is caused to be fully open. Since the deceleration fuel cut is a generally performed type of engine control and is frequently implemented for the purpose of increasing engine braking force during deceleration, improving gas mileage, or the like, by carrying out maximum torque set value correction in synchronization with the deceleration fuel cut, the frequency of torque correction can be increased without depending on the throttle being operated by the driver.

Note that when the driver presses down on the accelerator, the deceleration fuel cut needs to be immediately deactivated and returned to the normal combustion mode (recovery from a fuel cut).

However, if rapid recovery from a fuel cut is carried out based on the same logic as is normal during the period when the throttle is fully open as in the present embodiment, generated torque becomes significant during recovery since the volume of intake air is large, thereby increasing the possibility of generating torque shock.

Thus, in this embodiment, the problem of torque shock is solved by adopting a method by which a function of the ignition/fuel-based torque control path is utilized, and the number of fuel cut cylinders is controlled through a torque correction factor for ignition/fuel control.

The torque correction factor for ignition/fuel control is calculated as the ratio of an estimated air-component torque that is estimated to be generated by a throttle operation to the target torque that needs to be generated at the time (=target torque/estimated air-component torque), and by using the index, the controlling amount of ignition/fuel necessary for realizing the target torque can be automatically calculated without depending on the throttle operation.

The nature of such control will be described with reference to FIG. 14. The driver releases the accelerator, the degree of accelerator opening becomes nearly fully closed, and the flag for executing a deceleration fuel cut becomes ON (time t21). Next, the target torque decreases in a ramp shape and becomes 0 in the end (time t22). During all such time, since the air-based target torque is constant and the estimated air-component torque does not significantly change in conjunction therewith, the torque correction factor for ignition/fuel control (estimated air-component torque/target torque) is also decreased in a ramp shape in conjunction with the target torque and it becomes 0 in the end (time t22).

The torque control method selecting means 210 selects the number of fuel cut cylinders, and the means 213 of calculating the number of fuel cut cylinders calculates the number of fuel cut cylinders in accordance with the torque correction factor for ignition/fuel control. Note that conversion from the torque correction factor for ignition/fuel control to the number of fuel cut cylinders is carried out based on the rules shown in FIG. 15. In this embodiment, in a 4-cylinder engine, the smaller the torque correction factor, the fewer the number of fuel cut cylinders, and a fuel cut is carried out with respect to all the cylinders when the torque correction factor=0.

The deceleration fuel cut begins at time t21, and when a fuel cut to all the cylinders is established in the end, the throttle becomes fully open for a predetermined period (t23 to t24) by the means 214 of instructing a throttle to be fully open during a deceleration fuel cut. However, when the accelerator is pressed down during this period when the throttle is fully open, recovery from the fuel cut needs to be carried out by promptly terminating the maximum torque set value correction logic. The following logic is used for the handling.

When it is determined that an accelerator has been pressed down, the air-based target torque is brought back to the normal mode, and the throttle opening is also brought back to the normal mode in conjunction therewith. Simultaneously, the target torque is brought close to a torque demanded by the accelerator pedal from 0 in a ramp shape.

Further, the estimated air-component torque calculating means 208 performs an intake air delay processing based on the air-based target torque, so as to estimate a torque that is generated by the throttle operation.

Note that the present operation calculates torque by assuming a case in which fuel injection is carried out as is normal even during a fuel cut.

Figures 14, 15:
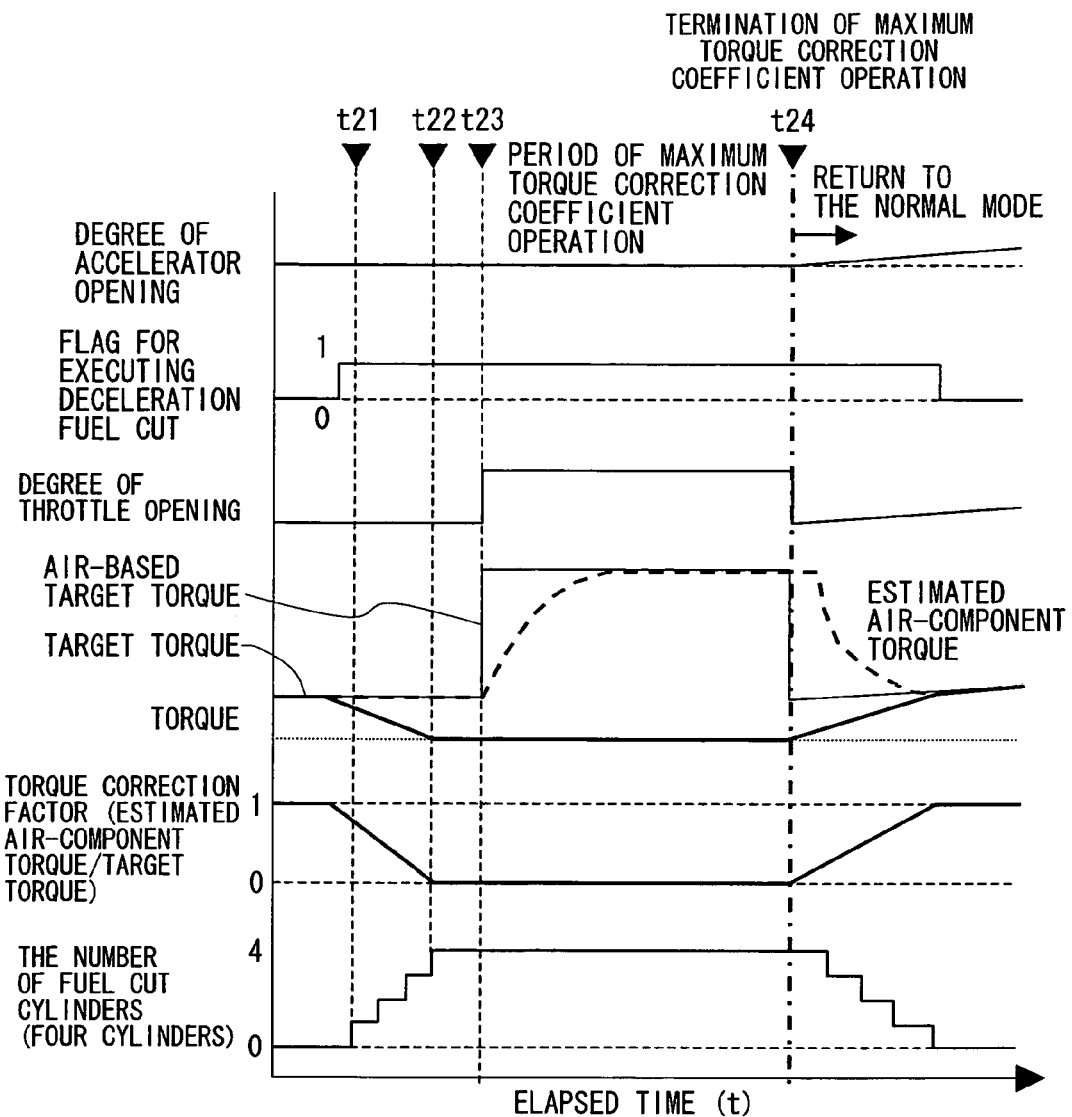
FIG. 14 shows a time chart of calculation of the number of fuel cut cylinders during a deceleration fuel cut and recovery from the fuel cut according to another embodiment.
FIG. 15 shows a table of the relation between the torque correction factor for ignition/fuel control and the corresponding number of fuel cut cylinders according to another embodiment.

Since a great volume of air remains in a cylinder due to delay in air response immediately after the throttle is closed, the value of the estimated air-component torque becomes large as a broken line of FIG. 14 shows.

The means 209 of calculating a torque correction factor for ignition/fuel control calculates the torque correction factor for ignition/fuel control (target torque/estimated air-component torque) by using the above target torque and the above estimated air-component torque, and the means 213 of calculating the number of fuel cut cylinders 213 calculates the number of fuel cut cylinders in accordance with the torque correction factor for ignition/fuel control, as in the case of a fuel cut.

As described above, by estimating the torque generated immediately after a throttle is brought back to the normal value from full opening when assuming that fuel is injected from all cylinders as is normal (estimated air-component torque), determining the ratio of the estimated air-component torque to the target torque to be realized (torque correction factor for ignition/fuel control), and applying the number of fuel cut cylinders suitable for realizing the correction factor (rules shown in FIG. 15), the target torque can be realized, and simultaneously, torque shock can be prevented, even at the time of recovery from a fuel cut immediately after the throttle becomes fully open.

Note that, when the present logic is carried out, since there is concern that the engine-braking effect may be deteriorated due to a decrease in pumping loss when the throttle is fully open or brake servo force may be deteriorated due to a decrease in negative pressure of the brake, it is desirable that the period when the throttle is fully open is short (0.5 sec or shorter, for example).

Further, when negative pressure information is obtained from a brake negative pressure sensor and the negative pressure has become decreased, measures such as not activating the present logic are effective for securing negative pressure of a predetermined value or greater.

The invention claimed is:

1. An engine controller for controlling an engine mounted with an electronically controlled throttle, comprising:
   a means for, when the throttle is fully open, correcting a maximum torque set value based on the ratio between the maximum air volume set value under fully-open throttle conditions and an actual maximum air volume detected by an intake air volume meter; and
   a means for correcting both the relation between the degree of accelerator opening and target torque and the relation between the target torque (target air volume) and the degree of target throttle opening based on the corrected maximum torque set value.

2. The engine controller according to claim 1, wherein the maximum torque set value is corrected by fully opening the electronically controlled throttle during execution of a fuel cut with respect to all cylinders.

3. The engine controller according to claim 1, wherein the target throttle is operated based on the target air volume by using an operation map of the volume of target air and the degree of throttle opening, and a normalized target air volume, which is obtained by dividing the volume of target air by a maximum air volume corrected in conjunction with the maximum torque set value, is used as an argument of the target throttle opening operation map.

4. An engine controller for controlling an engine mounted with an electronically controlled throttle,
   wherein, when the electronically controlled throttle is fully open, a target air volume set based on engine load is compared with the volume of air measured by an intake air volume meter to corrects a maximum air volume set value based on the results of such comparison and to correct the target air volume based on such corrected maximum air volume set value.

5. The engine controller according to claim 4, wherein the degree of throttle opening of the electronically controlled throttle is calculated by using the ratio between the target air volume and the maximum air volume set value in which the results of such correction are reflected.

6. The engine controller according to claim 4, wherein, when variations in air density are generated due to variations in temperature or altitude, the controller performs the control of maintaining characteristics such that the degree of throttle opening of the electronically controlled throttle changes when a certain target torque is inputted and the electronically controlled throttle becomes fully open when the accelerator is fully depressed.

7. The engine controller according to claim 4, wherein the maximum air volume set value is corrected by fully opening the electronically controlled throttle during execution of a fuel cut with respect to all cylinders.

8. An engine controlling method for controlling an engine mounted with an electronically controlled throttle, comprising:
   comparing, when the electronically controlled throttle is fully open, a target air volume set based on engine load with the volume of air measured by an intake air volume meter;
   correcting a maximum air volume set value based on the comparison result; and
   correcting the target air volume based on the corrected maximum air volume set value.

9. An engine controlling method for controlling an engine mounted an electronically controlled throttle, comprising:
   correcting, when the throttle is fully open, a maximum torque set value based on the ratio between the maximum air volume set value under fully-open throttle conditions and an actual maximum air volume detected by an intake air volume meter; and
   correcting both the relation between the degree of accelerator opening and target torque and the relation between the target torque (target air volume) and the degree of target throttle opening based on the corrected maximum torque set value.

* * * * *